US011500826B2

(12) United States Patent
Maurya et al.

(10) Patent No.: US 11,500,826 B2
(45) Date of Patent: Nov. 15, 2022

(54) SYSTEM FOR TRANSLATING DATA, EXTRACTED FROM DISPARATE DATASOURCES, BASED ON A DEFINED METADATA AND SCHEMA

(71) Applicant: HCL Technologies Limited, Noida (IN)

(72) Inventors: Arvind Kumar Maurya, Noida (IN); Mohammad Feroz Khan, Noida (IN); Praveen Kumar Jain, Noida (IN); Vidhi Bajaj, Noida (IN); Yogesh Gupta, Noida (IN)

(73) Assignee: HCL Technologies Limited, Noida (IN)

( * ) Notice: Subject to any disclaimer, the term of this patent is extended or adjusted under 35 U.S.C. 154(b) by 322 days.

(21) Appl. No.: 15/933,236

(22) Filed: Mar. 22, 2018

(65) Prior Publication Data
US 2018/0285389 A1 Oct. 4, 2018

(30) Foreign Application Priority Data
Apr. 4, 2017 (IN) .............................. 201711012125

(51) Int. Cl.
*G06F 16/21* (2019.01)
*G06F 16/25* (2019.01)

(52) U.S. Cl.
CPC ............ *G06F 16/211* (2019.01); *G06F 16/25* (2019.01); *G06F 16/258* (2019.01)

(58) Field of Classification Search
CPC .............................. G06F 16/254; G06F 16/211
See application file for complete search history.

(56) References Cited

U.S. PATENT DOCUMENTS

| | | |
|---|---|---|
| 5,884,310 A | 3/1999 | Brichta et al. |
| 7,953,695 B2 | 5/2011 | Roller et al. |
| 2004/0128276 A1 | 7/2004 | Scanlon et al. |

(Continued)

OTHER PUBLICATIONS

"CAPSENTA"; "NoETL the power of integrating disparate data sources to improve patient & business outcomes.", 2015.

*Primary Examiner* — Mohammad S Rostami
(74) *Attorney, Agent, or Firm* — Kendal Sheets

(57) ABSTRACT

Disclosed is a system for translating data, extracted from disparate data sources, into a homogeneous dataset to provide meaningful information. The database schema definition module defines a database schema in order to extract meaningful information pertaining to a specific use-case. The data source determination module determines one or more disparate data sources pertinent to extract the meaningful information. The data extraction module extracts heterogeneous dataset from the one or more disparate data sources. The data extraction module further passes the heterogeneous dataset to a Data-Translate Markup Language (DTML) executer to translate the heterogeneous dataset into a homogeneous dataset. The data translation module translates the heterogeneous dataset into the homogeneous dataset by using at least one data adapter. In one aspect, the heterogeneous dataset may be translated to perform data analytics on the homogeneous dataset in order to provide the meaningful information pertaining to the specific use-case.

9 Claims, 5 Drawing Sheets

(56) References Cited

U.S. PATENT DOCUMENTS

| | | | |
|---|---|---|---|
| 2007/0168228 A1* | 7/2007 | Lawless | G06F 19/3456 |
| | | | 705/2 |
| 2009/0172047 A1* | 7/2009 | Boyko | G06F 16/254 |
| 2011/0313969 A1* | 12/2011 | Ramu | G06F 16/254 |
| | | | 707/602 |
| 2016/0085754 A1* | 3/2016 | Gifford | G16H 50/30 |
| | | | 707/723 |
| 2016/0179895 A1* | 6/2016 | Cosma | G06F 16/22 |
| | | | 707/711 |
| 2017/0063886 A1* | 3/2017 | Muddu | G06F 3/0482 |
| 2017/0104627 A1* | 4/2017 | Bender | H04L 67/1008 |
| 2017/0124269 A1* | 5/2017 | McNair | G16H 10/60 |
| 2017/0293617 A1* | 10/2017 | Wang | G06F 16/51 |
| 2018/0218052 A1* | 8/2018 | Cosgrove, Jr. | G06F 16/254 |

\* cited by examiner

SYSTEM FOR TRANSLATING DATA, EXTRACTED FROM DISPARATE DATASOURCES, BASED ON A DEFINED METADATA AND SCHEMA

CROSS REFERENCE TO RELATED APPLICATIONS

This present application claims benefit from Indian Complete Patent Application No. 201711012125 filed on 4 Apr. 2017, the entirety of which is hereby incorporated by reference.

TECHNICAL FIELD

The present subject matter described herein, in general, relates to translate data, extracted for disparate data sources, based on a database schema. More specifically, a system for translating the data in order to provide meaningful information pertaining to a specific use-case.

BACKGROUND

Today there is lots of thrust by organizations to go data driven by using capabilities of huge amount of data available through data logs, social media, Internet, and support systems to become data driven organization. Since the data available from such disparate data sources are discrete in nature, it becomes a challenge to translate not only structural but un-structural data as well. Some of the challenges faced by the traditional systems are mentioned below.

Data warehouses typically play host to relational database technologies, referred to many forward-thinking vendors as "legacy" tools. This approach to Data Management is highly governed, as the data warehouses store the data in a structured manner, segmenting the data into stores based on specific data types. It must be understood that the data warehouses are including the data that has already been integrated. However, the data warehouses are limited in a sense as they have trouble in hosting the data from unstructured data sources such as data collected from product sensors, social media and other non-traditional sources. On the other hand, many enterprises usually have multiple data warehouses which were set up to run analysis on different types of data. This is because once a database is in place, it takes a considerable amount of time and energy to change them. For that reason, the enterprises that want to analyze the data of different types realizes that the data warehouse model is significantly degrading the performance outcome.

To overcome the above lacunae, Data Lakes allow users to go beyond the structure of the data warehouse to explore the data in unconventional ways. However, the concept brings along the security concerns and therefore allows the sensitive data to be compromised because of the fact that the technology is largely open source and so vaguely structured.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for translating data, extracted from disparate data sources, in accordance with a database schema to provide meaningful information and the concepts are further described below in the detailed description. This summary is not intended to identify essential features of the claimed subject matter nor is it intended for use in determining or limiting the scope of the claimed subject matter.

In one implementation, a system for translating data, extracted from disparate data sources, into a homogeneous dataset in accordance with a database schema to provide meaningful information is disclosed. The system may comprise a processor and a memory coupled to the processor. The processor may execute a plurality of modules present in the memory. The plurality of modules may comprise a database schema definition module, a data source determination module, a data extraction module, and a data translation module. The database schema definition module may define a database schema in order to extract meaningful information pertaining to a specific use-case. The data source determination module may determine one or more disparate data sources pertinent to extract the meaningful information associated to the specific user-case. The data extraction module may extract heterogeneous dataset from the one or more disparate data sources by using at least one data extraction technique. The data extraction module may further pass the heterogeneous dataset to a Data-Translate Markup Language (DTML) executer in order to translate the heterogeneous dataset into a homogeneous dataset in accordance with the database schema definition. The data translation module may translate the heterogeneous dataset into the homogeneous dataset by using at least one data adapter. In one aspect, the heterogeneous dataset may be translated to perform data analytics on the homogeneous dataset in order to provide the meaningful information pertaining to the specific use-case.

In another implementation, a method for translating data, extracted from disparate data sources, into a homogeneous dataset in accordance with a database schema to provide meaningful information is disclosed. In order to translate, a database schema may be defined in order to extract meaningful information pertaining to a specific use-case. Upon defining the data schema, one or more disparate data sources may be determined pertinent to extract the meaningful information associated to the specific user-case. Subsequent to the determination of the one or more disparate data sources, heterogeneous dataset may be extracted from the one or more disparate data sources by using at least one data extraction technique. After extracting the heterogeneous dataset, the heterogeneous dataset may be passed to a Data-Translate Markup Language (DTML) executer in order to translate the heterogeneous dataset into a homogeneous dataset in accordance with the database schema definition. Once the heterogeneous dataset is passed, the DTML executer translates the heterogeneous dataset into the homogeneous dataset by using at least one data adapter. In one aspect, the heterogeneous dataset may be translated to perform data analytics on the homogeneous dataset in order to provide the meaningful information pertaining to the specific use-case. In one aspect, the aforementioned method for translating the data, extracted from the disparate data sources, to provide meaningful information may be performed by a processor using programmed instructions stored in a memory.

In yet another implementation, non-transitory computer readable medium embodying a program executable in a computing device for translating data, extracted from disparate data sources, into a homogeneous dataset in accordance with a database schema to provide meaningful information is disclosed. The program may comprise a program code for defining a database schema in order to extract meaningful information pertaining to a specific use-case. The program may further comprise a program code for determining one or more disparate data sources pertinent to extract the meaningful information associated to the specific user-case. The program may further comprise a program code for extracting heterogeneous dataset from the one or more disparate data sources by using at least one data extraction technique. The program may further comprise a program code for passing the heterogeneous dataset to a Data-Translate Markup Language (DTML) executer in order to translate the heterogeneous dataset into a homogeneous dataset in accordance with the database schema definition. The program may further comprise a program code for translating the heterogeneous dataset into the homogeneous dataset by using at least one data adapter, wherein the heterogeneous dataset is translated to perform data analytics on the homogeneous dataset in order to provide the meaningful information pertaining to the specific use-case.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
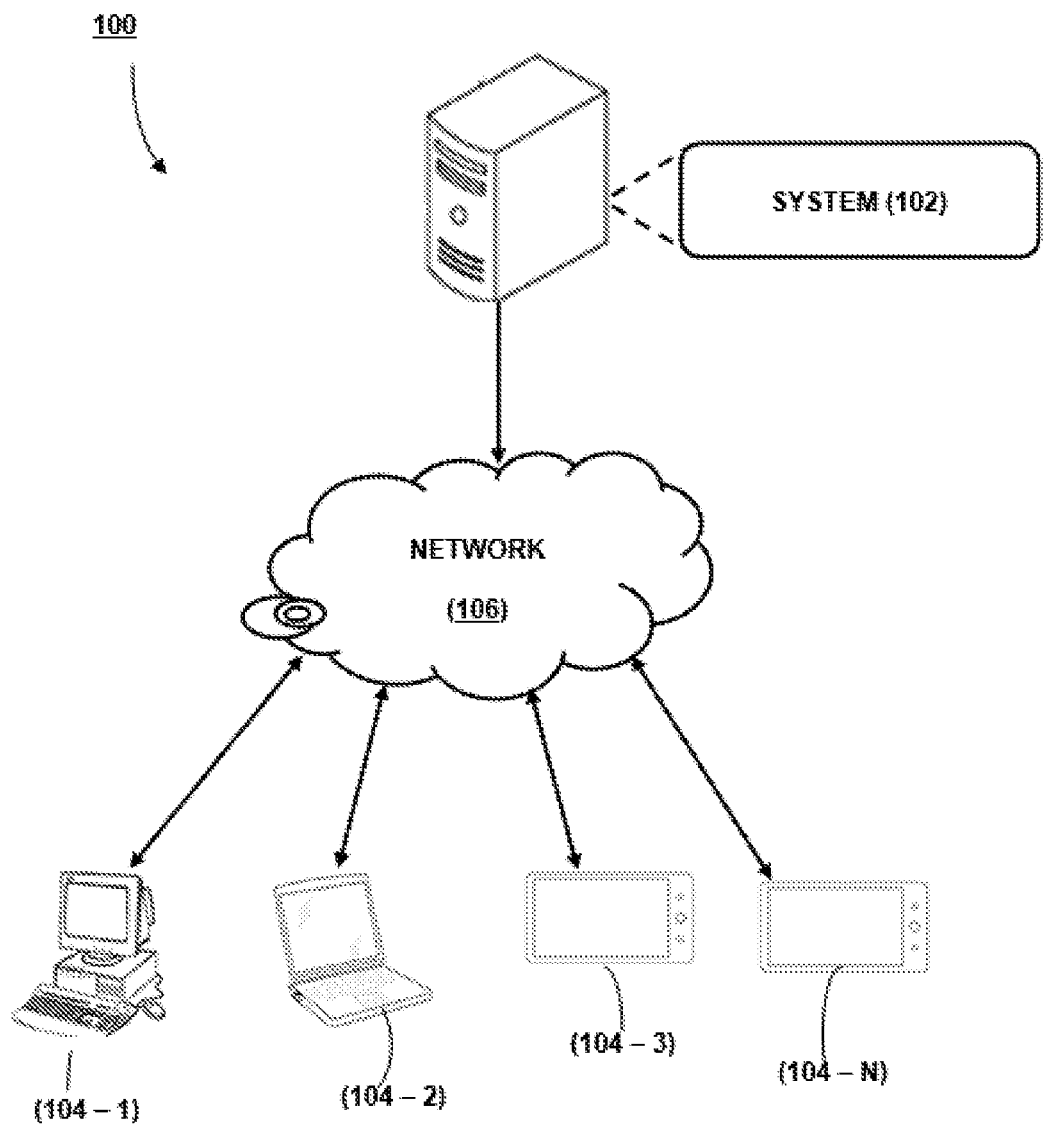
FIG. 1 illustrates a network implementation of a system for translating data, extracted from disparate data sources, into a homogeneous dataset to provide meaningful information, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

With availability of scalable computing resources and a huge amount of data in structured format and unstructured format, there is rapid transformation from traditional business intelligence to advanced analytics solutions. However, the data typically lies in variety of disparate data sources. Examples of the disparate data sources may include, but not limited to, logs, relational data sources, forums, and social networking websites. Since the data are in possession of someone who would not be encouraged to perform data analytics, it becomes a loss of opportunity to become a data driven organization. In order to enable the data analytics on the disparate data sources, the present invention facilitates to connect disparate data sources keeping security in context and accordingly provide the data to relevant stakeholders. In one aspect, the data may be provided to perform the data analytics on such data in order to deduce meaningful information.

To provide meaningful information pertaining to a specific use-case, initially, a database schema may be defined. Upon defining the database schema, one or more disparate data sources may be determined pertinent to extract the meaningful information associated to the specific user-case. The one or more disparate data sources comprises raw data stored in distributed location and in disparate formats. Subsequent to the determination of the one or more disparate data sources, heterogeneous dataset may be extracted from the one or more disparate data sources. After extracting the heterogeneous dataset, the heterogeneous dataset may be passed to a Data-Translate Markup Language (DTML) executer in order to translate the heterogeneous dataset into a homogeneous dataset in accordance with the database schema definition. The DTML executer, after passing the heterogeneous dataset, translates the heterogeneous dataset into the homogeneous dataset by using at least one data adapter. In one aspect, the heterogeneous dataset may be translated to perform data analytics on the homogeneous dataset in order to provide the meaningful information pertaining to the specific use-case.

While aspects of described system and method for translating data, extracted from disparate data sources, into a homogeneous dataset to provide meaningful information and may be implemented in any number of different computing systems, environments, and/or configurations, the embodiments are described in the context connected vehicles.

Referring now to FIG. 1, a network implementation 100 of a system 102 for translating data, extracted from disparate data sources, into a homogeneous dataset in accordance with a read-in database schema to provide meaningful information is disclosed. In order to translate the data, initially, the system 102 defines or get a read-in database schema in Data-Translate Markup Language (DTML) format in order to extract meaningful information pertaining to a specific use-case. With this DTML schema, the system 102 pass schema to DTML executer to extracts heterogeneous dataset from the one or more disparate data sources by using at least one data extraction technique. After extracting the heterogeneous dataset, heterogeneous datasets are translated to homogeneous dataset in accordance with the database schema definition by using at least one data adapter.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
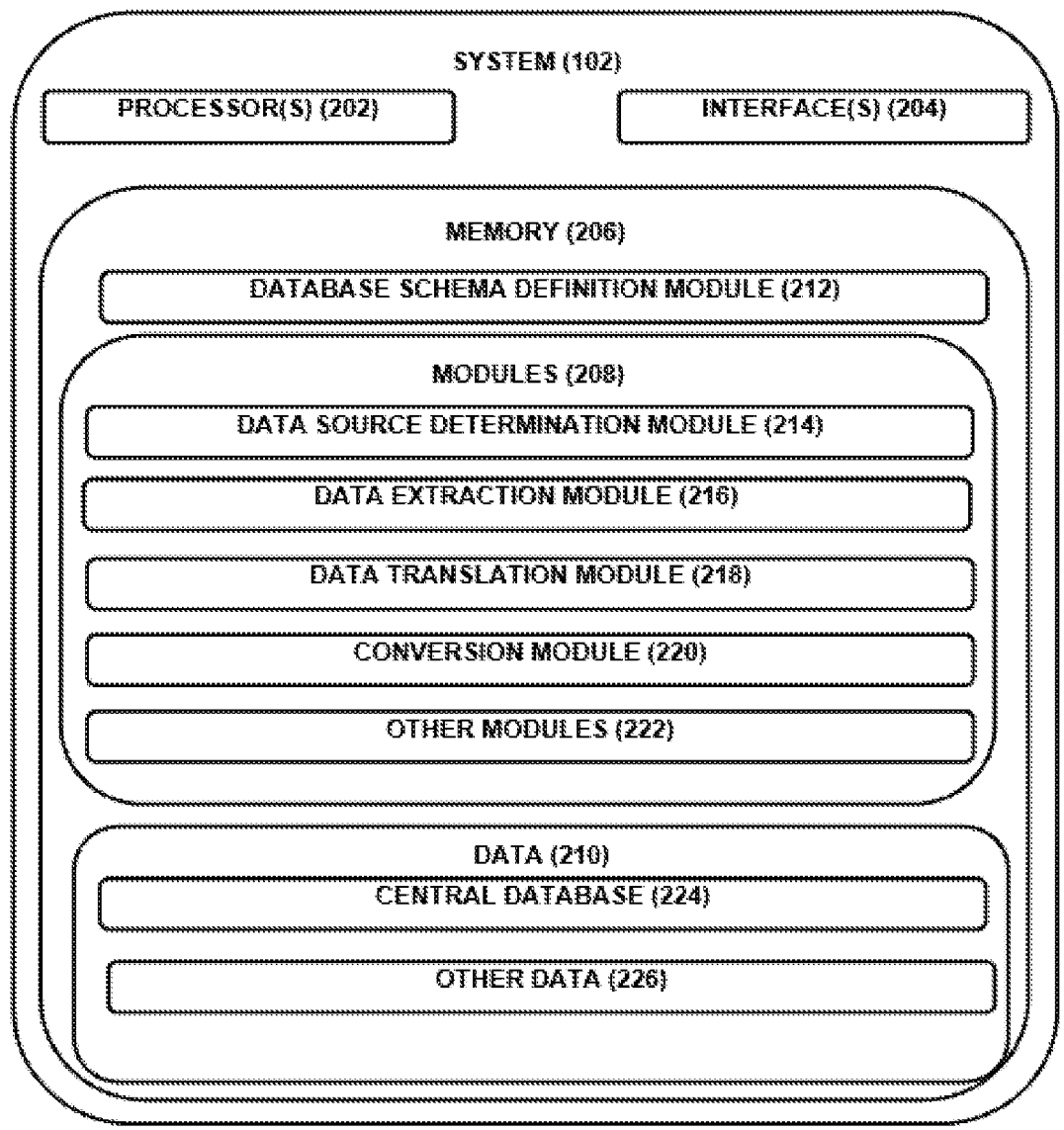
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include (hereinafter referred to as DTML executer) a data source determination module 214, a data extraction module 216, a data translation module 218, a conversion module 220, and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a central database 224, and other data 226. The other data 226 may include data generated as a result of the execution of one or more modules in the other modules 222.

As there are various challenges observed in the existing art, the challenges necessitate the need to build the system 102 for translating data, extracted from disparate data sources, into a homogeneous dataset to provide meaningful information. In order to translate the data, at first, a user may use the client device 104 to access the system 102 via the I/O interface 204. The user may register them using the I/O interface 204 in order to use the system 102. In one aspect, the user may access the I/O interface 204 of the system 102. The system 102 may employ the data source determination module 214, the data extraction module 216, the data translation module 218, and the conversion module 220. The detail functioning of the modules is described below with the help of figures.

In order to translate the data, extracted from disparate data sources, initially, the database schema definition module 212 defines a database schema in order to extract meaningful information pertaining to a specific use-case. In one aspect, the database schema may be defined against specific analytics need/use-case. Therefore, each database schema may be different and use any set of discrete and disparate data source. For example, for same set of discrete and disparate data source, many database schemas may be defined depending on the requirement to collect and refined data according to requirement. In one embodiment, after defining the database schema, the conversion module 220 converts the database schema into Data-Translate Markup Language (DTML) which can based on Executable Mark-up Language (XML) format or JavaScript Object Notation (JSON) format or any other format. Post conversion, the database schema in the XML format is provided to a Data-Translate Markup Language (DTML) executer. In one aspect, the DTML executer is configured to translate the data extracted from the disparate data source into a homogeneous dataset.

Upon definition of the database schema, various modules present in the DTML executer 208 may be enabled to translate the data. At first, the data source determination module 214 determines one or more disparate data sources pertinent to extract the meaningful information associated to the specific user-case. In one aspect, the one or more disparate data sources may comprise raw data stored in distributed location and disparate formats. The data extracted from the one or more disparate data sources may be in one of a structured data format and an unstructured data format. Subsequent to the determination of the one or more disparate data sources, data the extraction module 216 extracts heterogeneous dataset from the one or more disparate data sources. In one aspect, the heterogeneous dataset may be extracted by using at least one data extraction technique. Example of the at least one data extraction technique may include, but not limited to, an Extraction, Transform, and Load (ETL) process.

After extracting the heterogeneous dataset, the data extraction module 216 further passes the heterogeneous dataset to the data translation module 218 in order to translate the heterogeneous dataset into the homogeneous dataset in accordance with the database schema definition. The data translation module 218 translates the heterogeneous dataset into the homogeneous dataset by using at least one data adapter. Examples of the at least one data adapter may include, but not limited to, an Off the shelf DTML data adaptor and a custom data adaptor. In one aspect, the Off the shelf DTML data adaptor is an in-built data configured to translate the heterogeneous dataset, extracted from the one or more disparate data sources, into the homogeneous dataset upon executing a query built in accordance with the database schema. The custom data adaptor, on the other hand, may be configured to translate the heterogeneous dataset based on an interface.

Figure 3:
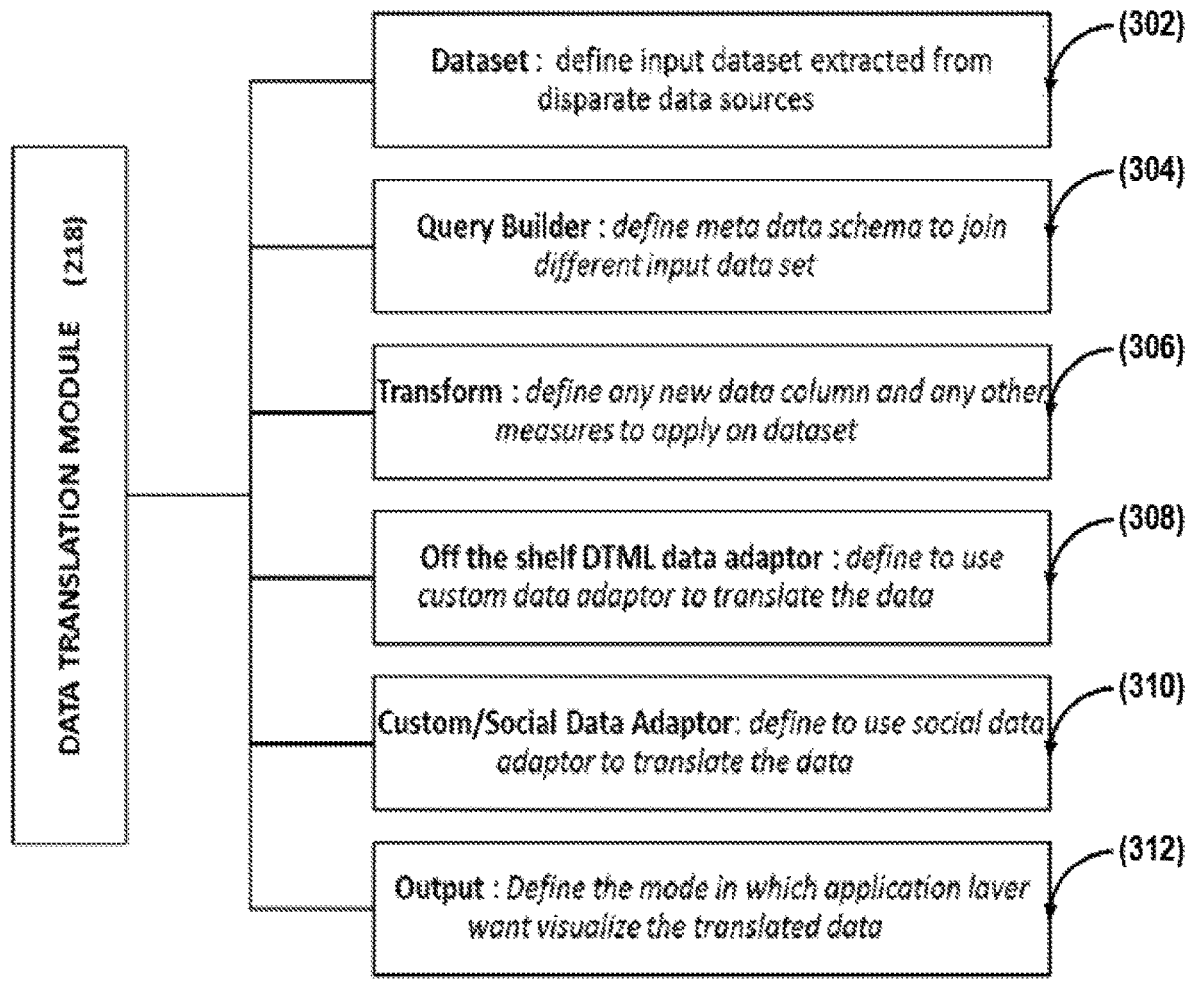
FIG. 3 illustrates the DTML structure and its different sub child and successor nodes to define data sources, final meta data schema and mode of translated, in accordance with an embodiment of the present subject matter.

Referring to FIG. 3. In one embodiment, the DTML executer, enabled by the module 208, translates the heterogeneous dataset into the homogeneous dataset. As illustrated in the FIG. 3, at block 302, the one or more disparate data sources may be defined for extracting the heterogeneous dataset. For example, the heterogeneous dataset extracted from the one or more disparate data sources may include:
Example:
Data source
Database 1
  Credentials
  Table 1
    Name: Alias
    Column Selected
    Encryption schema
  Table 2
Database 2

At block 304, metadata associated to the database schema may be defined. In one aspect, the metadata may be defined to determine the heterogeneous dataset upon joining the one or more disparate data sources by using one or more join operators. For example, the one or more join operators includes 'Left', 'Right', and 'Outer'. Some properties required to join multiple tables includes 'Left', 'Table Name', 'Right Table Name', 'Left Selected Columns', 'Right Selected Columns', 'Conditional Operators' such as 'AND', 'OR' and 'Where'.

Post defining the one or more disparate data sources and the metadata, at block 306, the data translation module 218 transforms the heterogeneous based on addition of at least one data column to the heterogeneous dataset. In one example, the below snippet indicates the transformation of the heterogeneous dataset:
Snippet:
Transform
ApplyToColumn
Operation
Add New Column
New Column Name
Default Value
Data Type The DTML executer 208 may translates the heterogeneous dataset into the homogeneous dataset by using one of the Off the shelf DTML data adaptor (as shown at block 308) and the custom/social data adaptor (as shown at block 310) and thereby visualizes the homogeneous dataset on a User Interface (UI) based on at least one mode defined by a user, as shown at block 312. In one example consider a below snippet indicating translation of the heterogeneous dataset by using the custom/social data adaptor.
Snippet:
Custom
ApplicationPath
Input data location
Output data location
Custom Data Adaptor Interface sample function list
  -execute—main entry function implemented by Custom Data Adaptor
  -GetMetaData—Meta data of resulted Translated data
  -getMetaDataType—Meta data type of resulted Translated data
  -getSaveDataLocation—resulted Translated data location
  -getResponseMessage—any error or message from custom data adaptor Upon transformation, the homogeneous dataset may then be used for data analytics in order to provide the meaningful information pertaining to the specific use-case. Thus, in this manner, the system 102 translates the data, extracted from the disparate data sources, in accordance with the database schema in order to provide the meaningful information.

Figure 4:
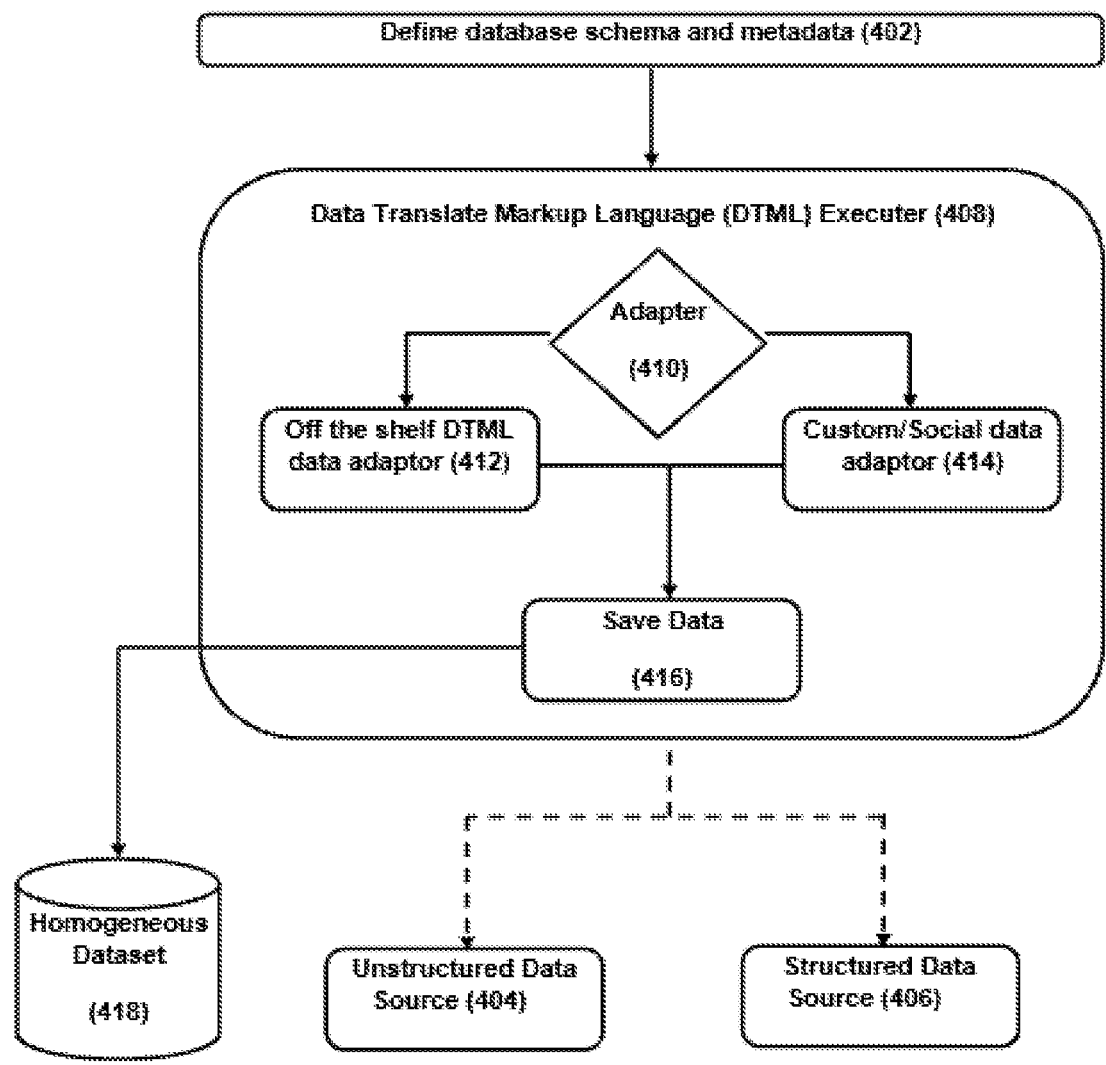
FIG. 4 illustrates an example, in accordance with an embodiment of the present subject matter.

In order to elucidate the aforementioned functioning of the modules 208, consider an example where the system 102 translates data, extracted from disparate data sources, in accordance with a database schema to provide meaningful information. As shown at block 402 of FIG. 4, the system 102 is mainly divided into 2 layers. A first layer is an application for end users to interact with the system 102 and define the database schema (or in-read database schema) along with metadata. A second layer is a Data Translate Markup Language (DTML) executor 208 service that extracts heterogeneous dataset from one or more disparate data sources and thereby translates the heterogeneous dataset based on defined in-read database schema and the metadata. Examples of the one or more disparate data sources comprise unstructured data sources 404 and structured data sources 406.

In one embodiment, in-read database schema along with the metadata may be defined, as shown at block 402. Upon defining the in-read database schema and the metadata, the one or more disparate data sources (the unstructured data sources 404 and the structured data sources 406) may be determined to extract the meaningful information associated to the specific user-case. In one aspect, the one or more disparate data sources may be used to extract the heterogeneous dataset and thereby provided to the DTML executor 208 for translating the heterogeneous dataset into the homogeneous dataset.

To do so, the DTML executor 208, at block 410, checks a type of data adaptor to be used for translating the heterogeneous dataset. In other words, the DTML executor 208 selects one of an Off the shelf DTML data adaptor 412 and a Custom/Social data adaptor 414 for translating the heterogeneous dataset into the homogeneous dataset. The DTML executor 208, based on selection of the data adaptor, translates the heterogeneous dataset into the homogeneous dataset. Upon translation, the system 102 stores the homogeneous dataset 418 at a specific location so that the homogeneous dataset 418 may further be used for data analytics in order to deduce meaningful information pertaining to the specific use-case. Thus, in this manner, the system 102 translates the data, extracted from the disparate data sources, in accordance with the database schema to provide the meaningful information.

Figure 5:
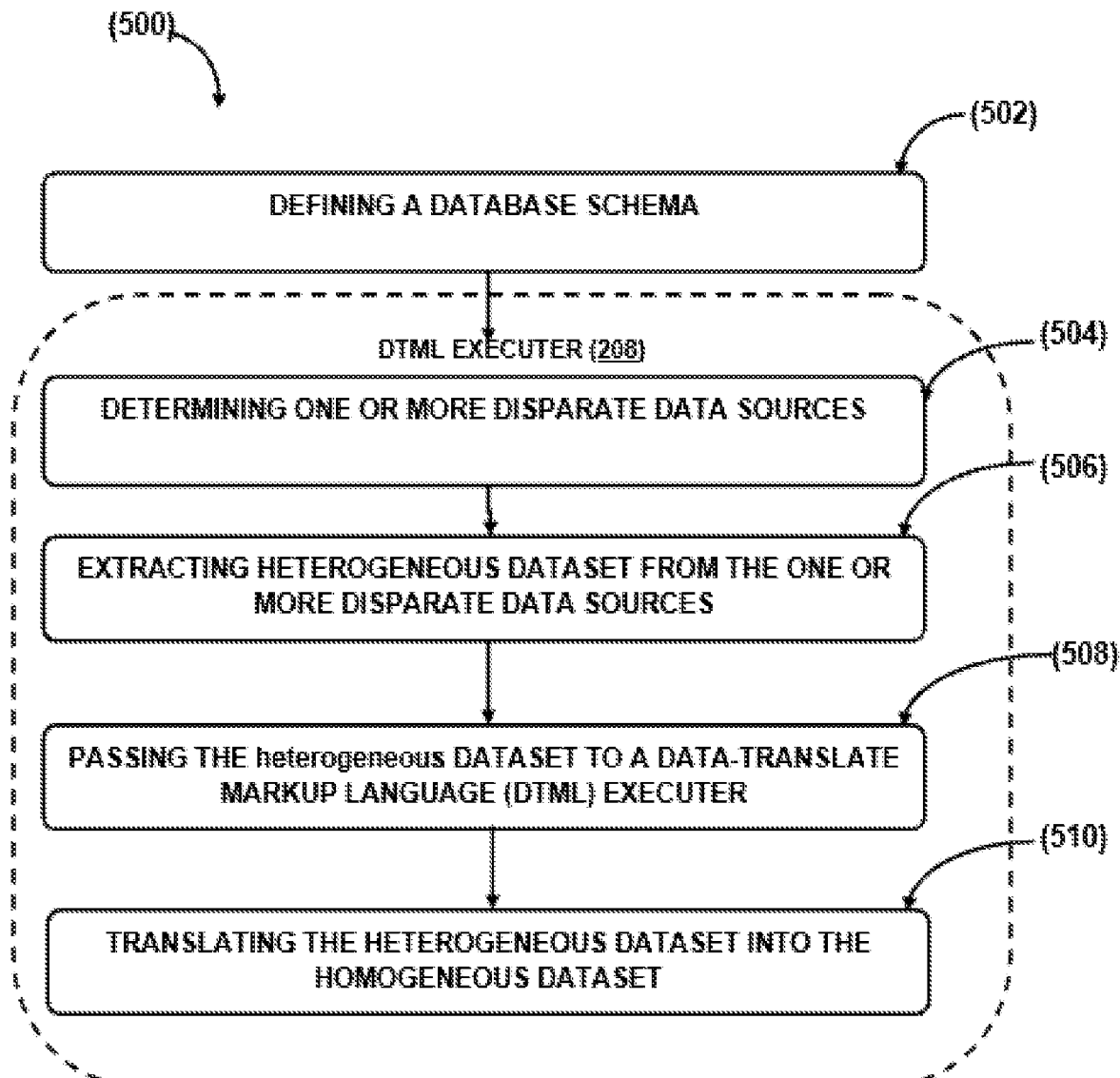
FIG. 5 illustrates a method for translating data, extracted from disparate data sources, into a homogeneous dataset to provide meaningful information, in accordance with an embodiment of the present subject matter.

Referring now to FIG. 5, a method 500 for translating data, extracted from disparate data sources, into a homogeneous dataset to provide meaningful information is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or -combination thereof. However, for ease of explanation, in the embodiments described below, the method 500 may be considered to be implemented as described in the system 102.

At block 502, a database schema may be defined in order to extract meaningful information pertaining to a specific use-case. In one implementation, the database schema may be defined by the database schema definition module 212.

At block 504, one or more disparate data sources may be determined pertinent to extract the meaningful information associated to the specific user-case. In one implementation, the one or more disparate data sources may be determined by the data source determination module 214.

At block 506, heterogeneous dataset may be extracted from the one or more disparate data sources by using at least one data extraction technique. In one implementation, the heterogeneous dataset may be extracted by the data extraction module 216.

At block 508, the heterogeneous dataset may be passed to a Data-Translate Markup Language (DTML) executer in order to translate the heterogeneous dataset into a homogeneous dataset in accordance with the database schema definition. In one implementation, the heterogeneous dataset may be passed by the data extraction module 216.

At block 510, the heterogeneous dataset may be translated into the homogeneous dataset by using at least one data adapter. In one aspect, the heterogeneous dataset may be translated to perform data analytics on the homogeneous dataset in order to provide the meaningful information pertaining to the specific use-case. In one implementation, the heterogeneous dataset may be translated by the data translation module 218.

Exemplary embodiments discussed above may provide certain advantages. Though not required to practice aspects of the disclosure, these advantages may include those provided by the following features.

Some embodiments enable a system and a method to connect disparate data sources keeping security in context and provide homogenous dataset to relevant stakeholders for view, dash boarding and perform analytics on it.

Some embodiments enable a system and a method to translate data based on the heuristic logic like join data based on primary/foreign key in the source data table.

Some embodiments enable a system and a method to cater multiple data sources, multiple databases and multiple tables in a single ETL design.

Some embodiments enable a system and a method to deliver end to end analytics with an intuitive drag and drop based zero coding approach.

Although implementations for methods and systems for translating data, extracted from disparate data sources, into a homogeneous dataset to provide meaningful information have been described in language specific to structural features and/or methods, it is to be understood that the appended claims are not necessarily limited to the specific features or methods described. Rather, the specific features and methods are disclosed as examples of implementations for translating the data into the homogeneous dataset.

The invention claimed is:

1. A method for translating data, extracted from disparate data sources, in accordance with a database schema to provide meaningful information, the method comprising:

defining, by a processor, a database schema in order to extract meaningful information pertaining to a specific use-case;

determining, by the processor, one or more disparate data sources pertinent to extract the meaningful information associated to the specific user-case, wherein disparate data sources are unstructured data sources and structured data sources, wherein the one or more disparate data sources comprise raw data stored in distributed locations and include one of logs, relational data sources, forums, and social networking websites;

extracting, by the processor, heterogeneous dataset from the one or more disparate data sources by using at least one data extraction technique;

converting, by a conversion module, the database schema into Data-Translate Markup Language (DTML);

providing, by the processor, the XML formatted database schema to a Data-Translate Markup Language (DTML) executer for translating, wherein the translating comprises:

defining the one or more disparate data sources;

defining metadata associated to the database schema in order to determine the heterogeneous dataset upon joining the one or more disparate data sources by using one or more join operators;

transforming the heterogeneous dataset into a transformed heterogeneous dataset based on addition of at least one data column to the heterogeneous dataset;

translating the transformed heterogeneous dataset into the homogeneous dataset by using one of an Off the shelf DTML data adaptor and a custom data adaptor;

visualizing the homogeneous dataset on a User Interface (UI) based on at least one mode defined by a user; and storing, by the processor, the homogeneous dataset at a specific location so the homogeneous dataset further used for data analytics in order to deduce meaningful information pertaining to the specific use-case.

2. The method of claim 1 further comprises converting, by the processor, the database schema into a Data-Translate Markup Language (DTML), wherein the DTML is based on Executable Mark-up Language (XML) format or JavaScript Object Notation (JSON) format or any other format.

3. The method of claim 1, wherein the at least one data adapter is one of an Off the shelf DTML data adaptor and a custom data adaptor.

4. The method of claim 3, wherein the Off the shelf DTML data adaptor is an in-built data configured to translate the heterogeneous dataset, extracted from the one or more disparate data sources, into the homogeneous dataset upon executing a query built in accordance with the database schema, and wherein the custom data adaptor is configured to translate the heterogeneous dataset based on an interface.

5. A system for translating data, extracted from disparate data sources, in accordance with a database schema to provide meaningful information, the system comprising:
a processor; and
a memory coupled to the processor, wherein the processor is capable of executing a plurality of modules stored in the memory, and wherein the plurality of modules comprising:
a database schema definition module for defining a database schema in order to extract meaningful information pertaining to a specific use-case;
a data source determination module for determining one or more disparate data sources pertinent to extract the meaningful information associated to the specific user-case, wherein disparate data sources are unstructured data sources and structured data sources, wherein the one or more disparate data sources comprise raw data stored in distributed locations and include one of logs, relational data sources, forums, and social networking websites;
a data extraction module for extracting heterogeneous dataset from the one or more disparate data sources by using at least one data extraction technique;
a conversion module for converting the database schema into Data-Translate Markup Language (DTML);
the processor configured for providing the XML formatted database schema to a Data-Translate Markup Language (DTML) executer to translate, wherein the processor is further configured for:
defining the one or more disparate data sources;
defining metadata associated to the database schema in order to determine the heterogeneous dataset upon joining the one or more disparate data sources by using one or more join operators;
transforming the heterogeneous dataset into a transformed heterogeneous dataset based on addition of at least one data column to the heterogeneous dataset;
translating the transformed heterogeneous dataset into the homogeneous dataset by using one of an Off the shelf DTML data adaptor and a custom data adaptor; and
visualizing the homogeneous dataset on a User Interface (UI) based on at least one mode defined by a user; and
storing the homogeneous dataset at a specific location so the homogeneous dataset further used for data analytics in order to deduce meaningful information pertaining to the specific use-case.

6. The system of claim 5 further comprises converting, by the processor, the database schema into a Data-Translate Markup Language (DTML), wherein the DTML is based on Executable Mark-up Language (XML) format or JavaScript Object Notation (JSON) format or any other format.

7. The system of claim 5, wherein the at least one data adapter is one of an Off the shelf DTML data adaptor and a custom data adaptor.

8. The system of claim 7, wherein the Off the shelf DTML data adaptor is an in-built data configured to translate the heterogeneous dataset, extracted from the one or more disparate data sources, into the homogeneous dataset upon executing a query built in accordance with the database schema, and wherein the custom data adaptor is configured to translate the heterogeneous dataset based on an interface.

9. A non-transitory computer readable medium embodying a program executable in a computing device for translating data, extracted from disparate data sources, in accordance with a database schema to provide meaningful information, the program comprising a program code:
a program code for defining a database schema in order to extract meaningful information pertaining to a specific use-case;
a program code for determining one or more disparate data sources pertinent to extract the meaningful information associated to the specific user-case, wherein disparate data sources are unstructured data sources and structured data sources, wherein the one or more disparate data sources comprise raw data stored in distributed locations and include one of logs, relational data sources, forums, and social networking websites;
a program code for extracting heterogeneous dataset from the one or more disparate data sources by using at least one data extraction technique;
a program code for converting the database schema into Data-Translate Markup Language (DTML);
a program code for providing the XML formatted database schema to a Data-Translate Markup Language (DTML) executer to translate, wherein the program code for the translating comprises:
a program code for defining the one or more disparate data sources;
a program code for defining metadata associated to the database schema in order to determine the heterogeneous dataset upon joining the one or more disparate data sources by using one or more join operators;
a program code for transforming the heterogeneous dataset into a transformed heterogeneous dataset based on addition of at least one data column to the heterogeneous dataset;
a program code for translating the transformed heterogeneous dataset into the homogeneous dataset by using one of the Off the shelf DTML data adaptor and the custom data adaptor; and
a program code for visualizing the homogeneous dataset on a User Interface (UI) based on at least one mode defined by a user; and
a program code for storing the homogeneous dataset at a specific location so the homogeneous dataset further used for data analytics in order to deduce meaningful information pertaining to the specific use-case.

* * * * *